United States Patent
Brocato et al.

(10) Patent No.: US 12,069,318 B2
(45) Date of Patent: *Aug. 20, 2024

(54) UNIFIED ROUTING AND CACHING LOGIC FOR APPLICATIONS UTILIZING A CONTENT DELIVERY NETWORK

(71) Applicant: Edgio, Inc., Phoenix, AZ (US)

(72) Inventors: Mark Brocato, Tallinn (EE); Ivan Erceg, Santiago (CL); Ishan Anand, Sammamish, WA (US)

(73) Assignee: Edgio, Inc., Phoenix, AZ (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/693,306

(22) Filed: Mar. 11, 2022

(65) Prior Publication Data

US 2022/0295117 A1  Sep. 15, 2022

Related U.S. Application Data

(60) Provisional application No. 63/160,660, filed on Mar. 12, 2021.

(51) Int. Cl.
*H04N 21/2183* (2011.01)
*G06F 8/71* (2018.01)
(Continued)

(52) U.S. Cl.
CPC ........... *H04N 21/2183* (2013.01); *G06F 8/71* (2013.01); *G06F 12/0808* (2013.01);
(Continued)

(58) Field of Classification Search
CPC ... H04N 21/2183; G06F 8/71; G06F 12/0808; G06F 12/084; G06F 12/0862; G06F 2212/6028; H04L 41/08; H04L 67/5682
See application file for complete search history.

(56) References Cited

U.S. PATENT DOCUMENTS 9,871,850 B1  1/2018  Brandwine
10,771,524 B1  9/2020  Long
(Continued)

OTHER PUBLICATIONS

"IBM Edge Computing Manager V4.0, formerly IBM Edge Computing, brings increased scalability, new functionality, and support for Red Hat OpenShift Container Platform 4.2". Updated Feb. 28, 2020. (Year: 2020).

(Continued)

*Primary Examiner* — Gil H. Lee
*Assistant Examiner* — Chhian (Amy) Ling
(74) *Attorney, Agent, or Firm* — Andrew J. Tibbetts; Greenberg Traurig, LLP

(57) ABSTRACT

Disclosed are systems and methods for providing unified routing and caching logic for applications utilizing a CDN. First, the system maintains access to one or more edge servers for a CDN, with the one or more edge servers being configured to execute edge logic. The system receives code for an application in a specified application framework, with the code and/or application framework including a unified set of routing and caching logic for dynamic data to be applied to a number of caches, and with the unified set of routing and caching logic being derived from a centralized definition. For each of the caches, the system first analyzes the set of routing and caching logic to determine a subset of the routing and caching logic to be executed by the cache, and then atomically sends the determined subset of the routing and caching logic to the cache.

20 Claims, 10 Drawing Sheets

(51) Int. Cl.
    *G06F 12/0808*     (2016.01)
    *G06F 12/084*     (2016.01)
    *G06F 12/0862*     (2016.01)
    *H04L 41/08*     (2022.01)
    *H04L 67/5682*     (2022.01)

(52) U.S. Cl.
    CPC ........ *G06F 12/084* (2013.01); *G06F 12/0862* (2013.01); *H04L 41/08* (2013.01); *H04L 67/5682* (2022.05); *G06F 2212/6028* (2013.01)

(56) References Cited

U.S. PATENT DOCUMENTS

| | | | |
|---|---|---|---|
| 11,218,561 | B1 | 1/2022 | Mondal |
| 2011/0283355 | A1 | 11/2011 | Livshits |
| 2016/0099849 | A1* | 4/2016 | Batla ................... H04L 67/535 709/203 |
| 2016/0344833 | A1* | 11/2016 | Håkansson ........ H04N 21/6125 |
| 2019/0082027 | A1* | 3/2019 | Choi ...................... H04L 67/568 |
| 2019/0253318 | A1* | 8/2019 | Leng ....................... H04L 12/46 |
| 2021/0014114 | A1 | 1/2021 | Doshi |
| 2021/0232492 | A1* | 7/2021 | Tsirkin ................... G06F 21/57 |
| 2022/0294689 | A1 | 9/2022 | Brocato |
| 2022/0294866 | A1 | 9/2022 | Brocato |

OTHER PUBLICATIONS

"Overview of edge computing". Updated Mar. 17, 2021 (Year: 2021).

Sabella et al, "Developing Software for Multi-Access Edge Computing." Published Feb. 2019. (Year: 2019).

Kingberg et al, "Edge Computing for Serverless Application" Published Jul. 2019. (Year: 2019).

* cited by examiner

```
// Example XDN routes file for a Next.js app const { Router } = require('@xdn/core/router')
const { nextRoutes } = require('@xdn/next')

export default nextJSApp => {
  return new Router()
    .get('/p/:productId', ({ cache }) => {
      cache({
        edge: {
          // cache the SSR response at the edge
          maxAgeSeconds: 60 * 60, // one hour
          staleWhileRevalidateSeconds: 60 * 60 * 24, // one day
        },
      })
    })
    .use(nextRoutes) // serve pages using Next.js's built-in routing
    .fallback((( proxy )) => proxy('legacy')) // serve unmatched URLs from the legacy implementation of the
site so we can gradually role out the new PWA page by page.
}
```

Routes

| | Route (Click for details) | Hit % | % of traffic | TTLs |
|---|---|---|---|---|
| | | Route indexes matched | | |
| 1 | match() | | 8.4% | |
| 2 | match("/") | 99.7% | 43.8% | maxAgeSeconds: 31,536,000<br>staleWhileRevalidateSeconds: 31,536,000 |
| 3 | match("/api/guides") | 95.3% | 2.1% | maxAgeSeconds: 31,536,000<br>staleWhileRevalidateSeconds: 31,536,000 |
| 4 | match("/api/guides/:guide") | 92.3% | 20.6% | maxAgeSeconds: 31,536,000<br>staleWhileRevalidateSeconds: 31,536,000 |
| 5 | match("/api/versions") | 96.2% | 2.0% | maxAgeSeconds: 31,536,000<br>staleWhileRevalidateSeconds: 31,536,000 |
| 6 | match("/docs/api/:path*/") | 55.0% | 0.1% | maxAgeSeconds: 31,536,000<br>staleWhileRevalidateSeconds: 31,536,000 |
| 7 | match("/docs/api/:path*/") | 73.3% | 2.1% | maxAgeSeconds: 31,536,000<br>staleWhileRevalidateSeconds: 31,536,000 |
| 8 | match("/docs/:version/api/:path*/") | 16.2% | 0.3% | maxAgeSeconds: 31,536,000<br>staleWhileRevalidateSeconds: 31,536,000 |

Filter...

```
"destinations": {
  "default": {
    "index": 0,
    "routes": [
      {
        "path": "/__xdn__/cache-manifest.js",
        "routeJson": "{\"path\":\"/__xdn__/cache-manifest.js\"}",
        "match": {
          {
            "value": "${path}",
            "matchRegex": "(?)/__xdn__/cache-manifest\\.js(\\?)?$"
          }
        },
        "cache": {
          "maxAgeSeconds": 31536000
        },
        "route": {
          "action": "proxy",
          "backend": "__js__"
        },
        "transform": {
          "request": [],
          "upstreamResponse": [
            {
              "action": "set-header",
              "name": "vary",
              "value": "accept-encoding"
            }
          ],
          "response": [
            {
              "action": "set-header",
              "name": "cache-control",
              "value": "private, max-age=3600"
            },
            {
              "action": "set-header",
              "name": "content-type",
              "value": "text/javascript"
            },
            {
              "action": "set-header",
              "name": "Access-Control-Allow-Origin",
              "value": "*"
            }
          ]
        }
      }
    ]
  }
}
```

FIG. 3

```
routes.js - rsf-app-2020-12-09-1
JS cache.js    JS index.js    JS routes.js  •    JS [...categorySlug].js JS routes.js > [@] <unknown>
 1   const { Router } = require('@xdn/core/router')
 2   const { nextRoutes } = require('@xdn/next')
 3   const { API, SSR, cacheResponse } = require('./cache')
 4   const prerenderRequests = require('./xdn/prerenderRequests')
 5
 6   module.exports = new Router()
 7     .prerender(prerenderRequests)
 8     .match('/service-worker.js', ({ serviceWorker }) => {
 9        serviceWorker('.next/static/service-worker.js')
10     })
11     .match('/', cacheResponse(SSR))
12     .match('/api', cacheResponse(API))
13     .match('/s/:categorySlug', cacheResponse(SSR))
14     .match('/api/s/:categorySlug', cacheResponse(API))
15     .match('/p/:productId', cacheResponse(SSR))
16     .match('/api/p/:productId', cacheResponse(API))
17     .match('/api/p/:productId/suggestions', cacheResponse(API))
18     .use(nextRoutes)
19     .fallback(({ proxy }) => proxy('legacy'))
20
21
```

FIG. 8

UNIFIED ROUTING AND CACHING LOGIC FOR APPLICATIONS UTILIZING A CONTENT DELIVERY NETWORK

CROSS REFERENCE TO RELATED APPLICATIONS

This application claims the benefit of U.S. Application No. 63/160,660, filed Mar. 12, 2021, which is hereby incorporated by reference in its entirety.

FIELD

This application relates generally to the field of content delivery networks and in particular to providing unified routing and caching logic for applications utilizing a content delivery network.

BACKGROUND

Content delivery networks (hereinafter "CDNs") have revolutionized the way applications (e.g., websites and web applications) are hosted on the internet. Rather than relying on a single server to host a website or application, a CDN can be employed to distribute data across multiple servers. This is accomplished using "edge servers" which can be geographically distanced to deliver data using only the edge server closest to a requesting client device (such as a computer, tablet, or mobile phone). Edge servers are configured such that content is stored as close as possible to a requesting client machine. The result is that latency is drastically reduced, leading to dramatically improved page loading times.

There are multiple caches within a web application including, e.g., the browser cache, service worker cache, and the CDN cache. In some systems the CDN cache consists of an edge point-of-presence ("POP") and a centralized shield POP which the edge POPs coordinate with before fetching data from the origin server. A major difficulty lies in meeting the goal of all of these caches across different systems being synced with the right routing and caching behaviors for a given application. For instance, the application servers cannot direct the browser to clear its cache, nor can it direct a service worker to clear its respective cache. However, the application can direct the CDN to clear the CDN cache. As such, each separate cache will typically require its own separate defined routing and caching logic. This is burdensome for developers, as it requires as many as five or more pieces of code which all must be processed separately. If there are any changes to the application, each of these separate pieces of code will need to be evaluated and potentially modified, which is time-consuming, messy, and prone to errors.

Thus, there is a need in the field of CDNs to create new and useful systems and methods for providing unified routing and caching logic for applications utilizing a CDN in a way that allows developers to specify one set of defined caching and routing logic for all of the caches in a system, with the system handling configuration of routing and caching for each individual cache in an atomic fashion for the system as a whole.

SUMMARY

The invention overcomes the existing problems by providing unified routing and caching logic for applications utilizing a CDN. First, the system maintains access to one or more edge servers for a CDN, with the one or more edge servers being configured to execute edge logic. The system receives code for an application in a specified application framework, with the code and/or application framework including a unified set of routing and caching logic for dynamic data to be applied to a number of caches, and with the unified set of routing and caching logic being derived from a centralized definition. For each of the caches, the system first analyzes the set of routing and caching logic to determine a subset of the routing and caching logic to be executed by the cache, and then atomically sends the determined subset of the routing and caching logic to the cache.

In some embodiments, the number of caches includes at least one of the following: a browser cache, a service worker cache, and one or more CDN caches. In some embodiments, the edge worker cache is a CDN cache. In other embodiments, the edge worker may have a cache or storage separate from the CDN cache(s). In some embodiments, the routing and caching logic includes one or more of the following: cache expiration times, stale-while-revalidate time, cache key computation logic, associated application version, private and public cache behaviors, browser and edge cache behaviors, and prefetch behaviors.

In some embodiments, the system embeds an identifier in an edge logic submodule for processing the edge logic, where the identifier includes version metadata for a specific version of the application code; and in response to a request in an application, directs the request, based on the identifier, to only the specific corresponding version of the edge logic and corresponding version of the application code. In some embodiments, the system receives a cache policy associated with one of the plurality of caches, and atomically binds the cache policy and the application code together such that the cache policy is configured to only be executed in conjunction with the determined application version.

In some embodiments, the system selects the application from a plurality of versions of the application, where each version included a different version of the application code and the routing and caching logic for each of the plurality of caches based on a past deployment of the application.

BRIEF DESCRIPTION OF THE DRAWINGS

These drawings and the associated description herein are provided to illustrate specific embodiments of the invention and are not intended to be limiting.

FIG. 1A illustrates an example excerpt of CDN-as-programming language written for a compatible framework and configuring a content delivery platform's edge logic, in accordance with some embodiments.

FIG. 1B illustrates an implementation example of a metric page, in accordance with some embodiments.

FIG. 3 illustrates a sample intermediary routing file generated in accordance with some embodiments.

FIG. 8 illustrates an implementation example of caching and routing logic within application code, in accordance with some embodiments.

DETAILED DESCRIPTION

Figure 2:
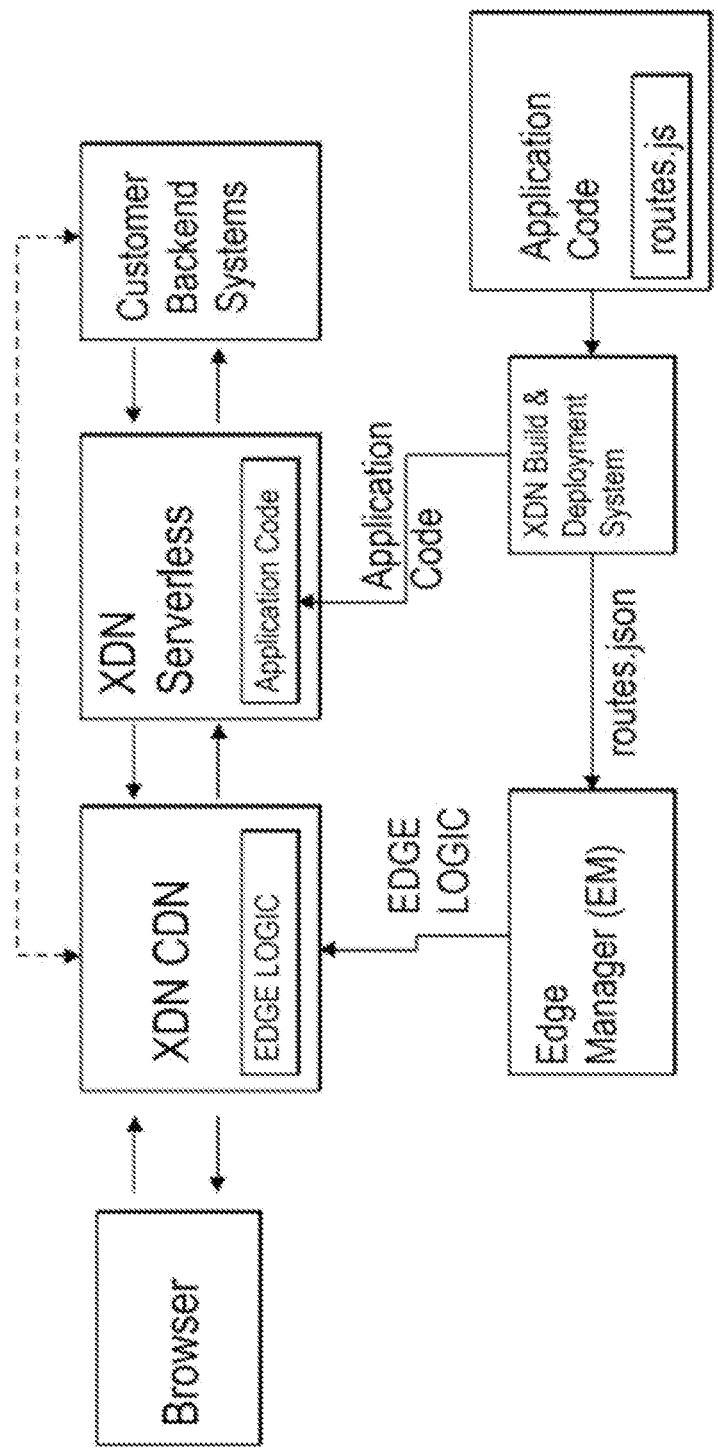
FIG. 2 illustrates an implementation example of CDN-as a programming language, in accordance with some embodiments.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

As described above, a CDN refers to a geographically distributed group of servers which work together to provide fast delivery of content on the Internet. A CDN allows for the quick transfer of assets needed for loading content including HTML pages, JavaScript files, stylesheets, images, and videos. CDNs are geographically distributed networks of proxy servers and data centers, with the goal of providing high availability and performance by distributing the service spatially close relative to end users. CDNs can include nodes that are deployed in multiple locations, often over multiple internet backbones. Benefits can include reducing bandwidth costs, improving page load times, or increasing global availability of content. The number of nodes and servers making up a CDN varies, depending on the architecture, some reaching thousands of nodes with tens of thousands of servers on many remote points of presence ("PoPs"). Others build a global network and have a small number of geographical PoPs.

Requests for content or functionality are typically algorithmically directed to CDN nodes that are optimal in some way. When optimizing for performance, locations that are best for serving content to the user may be chosen. This may be measured by choosing locations that are the fewest hops, the lowest number of network seconds away from the requesting client, or the highest availability in terms of server performance (both current and historical), so as to optimize delivery across local networks. When optimizing for cost, locations that are least expensive may be chosen instead. In an optimal scenario, these two goals tend to align, as edge servers that are close to the end user at the edge of the network may have an advantage in performance or cost.

Some CDN providers will provide their services over a varying, defined, set of PoPs, depending on the coverage desired, such as United States, International or Global, Asia-Pacific, etc. These sets of PoPs can be called "edges", "the edge", "edge nodes", "edge servers", or "edge networks" as they would be the closest edge of CDN assets to the end user.

Content Delivery Networks can augment an end-to-end transport network on the internet by distributing on it a variety of intelligent applications employing techniques designed to optimize content delivery. The resulting tightly integrated overlay uses web caching, server-load balancing, request routing, content services and other technologies to optimize content delivery. For example, Web caches store popular content on servers that have the greatest demand for the content requested. These shared network appliances reduce bandwidth requirements, reduce server load, and improve the client response times for content stored in the cache. Example web caching technologies include web caching populated based on requests from users (i.e., pull caching) or based on preloaded content disseminated from content servers (i.e., push caching).

Another CDN optimization technology, server load balancing, uses one or more techniques including service-based (global load balancing) or hardware-based (e.g., layer 4-7 switches, also known as a web switch, content switch, or multilayer switch) to share traffic among a number of servers or web caches. Here, the switch is assigned a single virtual IP address. Traffic arriving at the switch is then directed to one of the real web servers attached to the switch. This has the advantage of balancing load, increasing total capacity, improving scalability, and providing increased reliability by redistributing the load of a failed web server and providing server health checks. A content cluster or service node can be formed using a layer 4-7 switch to balance load across a number of servers or a number of web caches within a network.

Another optimization technology in CDN is request routing, which can direct client requests to the content source best able to serve the request. This may involve directing a client request to the service node that is closest to the client, or to the one with the most capacity. A variety of algorithms are used to route the request. These can include Global Server Load Balancing, DNS-based request routing, Dynamic metafile generation, HTML, rewriting, and anycasting. Proximity—choosing the closest service node—can be estimated using a variety of techniques including reactive probing, proactive probing, and connection monitoring. CDNs can use a variety of methods of content delivery including, but not limited to, manual asset copying, active web caching, and global hardware load balancers.

Edge computing is a technology that evolved from CDNs and is also a distributed computing paradigm that brings computation and data storage closer to the location where it is needed, to improve response times and save bandwidth. Edge computing networks have evolved to host applications and application components at the edge servers, resulting in commercial edge computing services that host applications such as dealer locators, shopping carts, real-time data aggregators, ad insertion engines, and many other web applications. Additionally, virtualization technology has made it easier to deploy and run a wider range of applications on edge servers to realize the benefits of CDNs.

CDNs and edge computing networks are also closely related to cloud computing and cloud computing networks. Cloud computing can provide the on-demand availability of computer system resources, especially data storage (cloud storage) and computing power, without direct active management by the user. Large clouds, predominant today, often have functions distributed over multiple locations from central servers. If the connection to the user is relatively close, it may be designated an edge server. Clouds may be limited to a single organization (enterprise clouds) or be available to multiple organizations (public cloud). Cloud computing relies on sharing of resources to achieve coherence and economies of scale. Cloud providers typically use a "pay-as-you-go" model, which charge users based on the resources they employ on a provider's platform. Cloud computing also utilizes hardware virtualization, service-oriented architecture, and autonomic and utility computing to provide their services.

One definition of edge computing can be any type of computer program that delivers low latency nearer to the requests. Similarly, edge computing can broadly be defined as all computing outside the cloud happening at the edge of the network, and more specifically in applications where real-time processing of data is required. In his definition, cloud computing operates on big data while edge computing operates on "instant data" that is real-time data generated by sensors or users. In some cases, edge computing concentrates on servers in close proximity to the last mile network. While more upstream servers handling data, content and/or functionality are more appropriately handled in cloud computing networks.

In the context of delivering services, data, information, content over the internet and CDNs, there are various actors and subsystems that the actors control. For example, an application developer may write the computer code that defines the behavior, appearance and processes of the application. For example, an e-commerce website developer can write the website code in JavaScript or other programming language and define the appearance of the web site, the paths, the application wireframes, and the user interface. The developer may also define how the e-commerce website is to interface with an inventory system, a checkout system and one or more databases that maintain customer information or marketing-related data. In the case of more advanced, enterprise-scale e-commerce websites, several developers may be involved in defining and coding various parts of the e-commerce website. For example, a frontend developer may be responsible for the UI appearance and wireframing of the e-commerce website, while one or more backend developers can be responsible for interfacing the e-commerce website to inventory and checkout systems. Besides developers, there may be additional actors that can control the functioning and appearance of an e-commerce website. For example, sales managers and marketing executives can also provide input and indirectly control the behavior of an application, such as an e-commerce web site.

Typically, if an application developer wants to take advantage of CDN and edge computing to optimize and speed up their application's web presence, they can use a control panel, provided by a CDN provider. In other words, the developer writes the application code separately and almost with no or minimal consideration of how the CDN is to optimize the application web presence. Of course, control panel functionality may be a one-size-fit-all with predetermined parameters that may or may not be applicable to the application developer. CDN control panels can be used to define parameters, such as zoning and caching behavior. While CDN control panels can be custom-coded based on the needs of an application developer to provide more tailored functionality and parameters, they are nonetheless essentially separate systems than the applications they serve. In other words, the application and the CDN are not synced. Changing the application behavior does not automatically change the behavior of CDN, without technical, human input into the control panel. This is at least partly due to the historical basis that CDNs did not run application code, and were thus separated from the systems which ran application code. The present invention seeks to address such issues, as the systems and methods herein tie elements of both the server hosting and the CDN entities together into a single functional platform.

Another method by which application developers can use CDNs is cache-control headers. HTTP headers let the client and the server pass additional information with an HTTP request or response. An HTTP header consists of its case-insensitive name followed by a colon (":"), then by its value. General headers apply to both requests and responses, but with no relation to the data transmitted in the body. In one respect, cache-control headers technique is an HTTP standard that tells browsers and CDNs when a resource is cacheable and for how long. However, Cache-Control headers and other HTTP standards are unable to specify the full range of typical cache optimization tasks that can provide greater optimization. Examples of such tasks include, ignoring query parameters or optimizing a cache key to include/exclude parts of a cookie (often used for personalization and internationalization).

Some CDNs support running code in Varnish Configuration Language (VCL), JavaScript, Web Assembly (WASM), or other computing languages, which an application developer can utilize at the edge to define the CDN behavior, such as the CDN caching behavior. This custom code can control parts of the caching process and the CDN behavior. However, this still creates a "second system" that must be maintained apart from the application where caching and CDN rules need to be manually propagated and maintained over time.

Despite the limitations described above, these techniques can be sufficient for caching static website assets, such as images and JavaScript files, because these resources can have simple caching requirements that rarely change. Caching dynamic data (e.g. the HTML and API data) at the edge is more difficult because the content can vary based on multiple variables, including some query parameters (but not others), header and cookie values, GraphQL post request body content, traffic splitting probabilities, dictionary values, and many others. Computing at the edge is required to cache these types of data and bring them closer to visitors to create a fast, reliable experience. Incidentally, serving cached responses can also save the application operator (CDN customer) money because it can "shield" traffic to the deeper, more costly, less scalable layers of the cloud, such as serverless computing, traditional servers, and databases.

As used throughout, one subset of "static" and "dynamic" data, assets, pages, or content can be usefully differentiated from one another relative to a developer's perspective. That is, will the developer be aware that a particular piece of content will not change from one deployment to another, but will remain reliably fixed? If so, then the content is static in nature. On the other hand, if the developer is aware that the content may be subject to change or modification upon deployment, then likely the developer is also aware that some code or logic must be implemented to handle the post-deployment changing of the content. Such content can be considered dynamic in nature. Other subsets of "dynamic" data which can be contemplated throughout include data, assets, pages, or content which are personalized, customized, or unique to a particular user's experience (e.g., content which is personalized with a particular user's details such as their name or language preferences), or to the experience of a particular group or class of users (e.g., premium users may see a different webpage than non-premium users). Other forms of dynamic data may be contemplated as well.

To enable the serving of cached responses, some CDN vendors have added edge computing capabilities through JavaScript, VCL, WASM, or APIs, yet even with these technologies, many sites rarely cache dynamic data, such as eCommerce catalog data. This in some cases is because the parameters of the application changed by application developer or application operator affect CDN behavior, such as caching, but are not automatically propagated to various layers of the CDN to sync its behavior. For example, the frontend developer determines what can and cannot be cached, which parameters and cookies change the cached content and which do not, and how to break web pages into various parts, yet CDNs may not have or provide direct syncing with the application for frontend developers to program or otherwise configure in relation to the application program code.

Furthermore, edge computing may have no awareness of the web app code and does not work within the web developer's workflow. Consequently, CDN and edge configuration have historically been managed by DevOps and backend teams. In these environments, edge configuration is manually synchronized across the edge control panel, the frontend code, and the backend code. Each of these are different systems with divergent management interfaces— CDNs are often controlled via a control panel and rules engine, whereas applications are written in a computer programming language, such as JavaScript. Given the high-risk of site breakage and overhead of synchronizing application changes to edge configurations, many frontend teams simply forgo caching of dynamic data, which can cost their companies money in extra spending on computing and lost conversions. In addition, the edge typically only exists within a cloud architecture, and thus it is difficult for developers to develop for the edge locally or across multiple staging environments.

The described embodiments provide methods and systems which can provide a programming language (with or without a graphical user interface), which can be used to define and configure CDN behavior in the same programming language in which an application utilizing the CDN is written. In other words, the CDN rules (such as routing and caching) can be embedded in the application program code. For example, if the application running on the CDN is written in JavaScript, the described embodiments can provide a CDN-as-JavaScript language enabling the application developer to define and embed the CDN behavior in the application code. Furthermore, the described embodiments utilize a CDN-as-programming language to define a delivery platform and network ("XDN"), which can interface with existing CDNs, clouds, and edge computing networks to deliver internet content and services. The XDN can also host and/or maintain at least some of the application code, in particular the "backend for frontend" code which implements backend operations that support the frontend of the application. Such backend code is configured to run on the server side in order to support the frontend for tasks such as, e.g., server side rendering and API orchestration and/or aggregation.

CDN-as-programming language (e.g., CDN-as-JavaScript) provides simpler control of the edge for frontend web and application developers. For example, routing logic can be defined once, natively in the application's routes.js file or equivalent, not separately in an edge worker or via a CDN control panel. With local and cloud emulation of the CDN, these CDN-as-JavaScript rules are more convenient and reliable because they go through the same cycle of local development to pull request to pre-production to release just as any other native part of the application code.

CDN-as-programming language makes previously painstaking-to-implement tasks, such as cache key optimization, easier to deploy. Further, it unlocks new capabilities such as predictive prefetching while dramatically reducing setup time and maintenance. In addition, CDN-as-programming language makes a platform "application aware," which can allow the platform to offer dashboards that specify controls and metrics in terms of the application's routes (e.g., "/p/: productid" or "all product pages") rather than a jumble of URLs (e.g., "/p/1", "/p/2", . . . etc. which can have separate metrics).

In some embodiments, CDN-as-programming language enables developers to manage the edge in their application code. It gives developers a central part of their application code that they write, for example, once, and then all other systems including the edge, frontend code, backend code, and service worker automatically inherit a unified CDN behavior (such as caching behavior). CDN-as-programming language also allows developers to emulate caching logic locally. And because the caching profile can live in the application code, it "atomically" propagates with the code through the software development life cycle, through local development, staging, Q/A, production release and even rollbacks. The system also automatically understands the routing of popular frameworks, such as JavaScript frameworks like Next.js and Nuxt.js, and can propagate their rewrites and redirection rules to the edge. Finally, CDN-as-programming language can include an easy-to-use dashboard that lets developers understand the caching and other performance metrics in terms of their application's routing instead of a confusing jumble of URLs.

As used throughout, "atomic" deployment refers to when the application behavior, as viewed by an end user or observer, appears as a single unified application and experience, regardless of the current state of the system potentially not being unified, e.g., being distributed across multiple versions, layers of the system, servers, etc. For example, an application may consist of front-end code, edge logic, and back-end code. When a developer deploys this application, each of these components runs in a different layer of the system. In addition, the system may have multiple versions of the application (e.g., version 1, version 2, version 3). As a result, the system would have multiple versions in each layer of its corresponding application components, e.g., front-end code version 1, front-end code version 2, front-end code version 3, edge logic version 1, edge logic version 3, etc. "Atomic" deployment ensures that the observed behavior of the application to any observer appears as a single version, i.e., a user will only get the experience corresponding to front-end code version 1 with edge code version 1 and back-end code version 1, such that all the versions correspond to one another. In no case under an atomic deployment would a user experience the result of executing components with a different version, i.e., front-end code version 1 with edge-logic version 2.

FIG. 1A illustrates an example excerpt 102 of CDN-as-programming language written in a compatible content delivery platform (e.g., XDN). An application developer can use CDN-as-programming language (e.g., CDN-as-JavaScript) to describe CDN rules in a path file of the application (e.g., in routes.js if JavaScript is used). The excerpt programming code shown in FIG. 1 is an example path or routes file (e.g., routes.js for an application built on the Next.js framework).

In the example shown in FIG. 1A, the application developer can utilize CDN-as JavaScript in coordination with a developer-specified application framework to specify various CDN behaviors, such as caching, routing, and fallback routing. For example, the excerpt code illustrated in FIG. 1A describes a caching behavior defined by the specified application framework, where Responses to HTTP GET requests with paths matching the routing pattern /p/:productId are configured by the application framework to be cached at the edge for one hour and to use the stale-while-revalidate protocol with a max stale age of one day. The /p/:productId is a routing pattern syntax, whereby the "productId" represents a variable path parameter in the URL. In some embodiments, this caching behavior can be defined in application code. In some embodiments, the caching behavior is defined via a combination of application code and an application framework which can be specified by the developer within the application code. The excerpt code in FIG. 1A also includes the application routing in a CDN, where, for example, the Next.js framework has built-in conventions for redirects and routing. For example, if there is a file called foo.js in the /pages directory, then, using the described embodiments, Next.js automatically creates a path on an application site as www.example.com/foo, and will execute foo.js when responding to requests for that path. The .use (nextRoutes) call can automatically propagate the built-in routes and redirects created by the framework to the edge/CDN network. This can also automatically allow the XDN platform and the tooling embedded therein to understand the application routing in terms of the application's routes instead of URLs. For example, the XDN platform can include Developer tools and cache metrics page 104, shown in FIG. 1B, where the results are in terms of the application's routes as opposed to URLs.

Furthermore, the excerpt code illustrated in FIG. 1A illustrates that an application developer can specify fallback routing. For example, the last line describes that any URLs that do not match a known route specified in the CDN-as-JavaScript (either explicitly in the example file or implicitly via use(nextRoutes)) should go to a "legacy" system. This can be useful, for example, when gradually migrating a site to Next.js (or similar framework) and some parts of the site are still not migrated. Fallback routes like this can allow the CDN-as-JavaScript to direct requests to the new version of the application or the old legacy system.

FIG. 2 illustrates an implementation example of CDN-as-programming language, described within a context where the programming language is JavaScript. The described system can be used for production traffic of a web site, a web application or other application deployed on the content delivery platform utilizing CDN-as a programming language (e.g., XDN). Some CDNs and their associated infrastructure do not interface via JavaScript and may use a more limited programming language, such as VCL. In that scenario, CDN-as-JavaScript can be translated into VCL.

When an application is built and deployed to the XDN, the application path file (e.g., the routes.js file) is translated into a declarative intermediate representation referred to as the routes.json. This intermediate representation contains a list of rules that capture the behavior specified in the CDN-as-JavaScript API, such as transformations, cache key manipulations, etc. An example snippet from a routes.json is shown in FIG. 3.

While some parts of the code snippet shown in FIG. 3 are recognizable such as the cache key timings and header values, the routes.json format illustrated therein is intended for machine translation. For example, the code snippet shown in FIG. 3 is the excerpt that can be generated for a single route and would correspondingly occupy only a single line of CDN-as-JavaScript in the application code. An Edge Manager (e.g., a module, library, or server which manages configuration of the underlying CDN servers) can translate this routes.json into VCL code and then the XDN system can deploy both the application CDN logic and the application code atomically to a CDN and/or cloud computing network as the case may be. Furthermore, in the case of a customer roll-back, both layers (CDN logic and application code) are also rolled back atomically. In FIG. 2 an XDN compatible CDN and serverless (e.g., cloud computing network) are shown. However, additional layers may also be present.

In one embodiment, the application code (e.g., a backend for frontend or BFF code) is received in an XDN build and deployment system, which can send the application code to the serverless layer. As described earlier, if CDN is not compatible with the programming language used in the application source code, an EM can translate the CDN logic embedded in the application program source code to an intermediary programming language compatible with the CDN and deploy the same to the CDN and the serverless network. In this manner, the CDN logic and the application code are synced and shared across various layers, including the CDN, the serverless or edge computing network if used. In some embodiments, the XDN build and deployment system extracts a path file from the application code (e.g., the routes.json) and sends the same to the EM. The EM can use the path file to translate the CDN logic and/or optimization algorithms to a programming language compatible with the CDN. In this manner, the CDN logic and the application code are synced and shared across various layers, including the CDN, the serverless or edge computing network if used. In some embodiments, the XDN CDN shown in FIG. 2 can be an edge computing network. In some embodiments, the CDN may be enabled to be compatible with the programming language of the application code and EM may be optional.

In another aspect, FIG. 2 illustrates the content delivery system (e.g., XDN) sitting between an end user browser, and a customer backend system. The customer can purchase the XDN services to make its web presence more optimized and to utilize CDN, edge computing and cloud computing more efficiently. The customer provides the application code in a source code programming language, such as JavaScript. Notably, the application code can include CDN programming and logic written in the same code language in which the application code is written and embedded in the application code just like any other part of the application code. For example, an application code written in JavaScript can include CDN logic written in JavaScript and embedded in the application code. The application code can be or can include backend for frontend (BFF) code.

Figure 4:
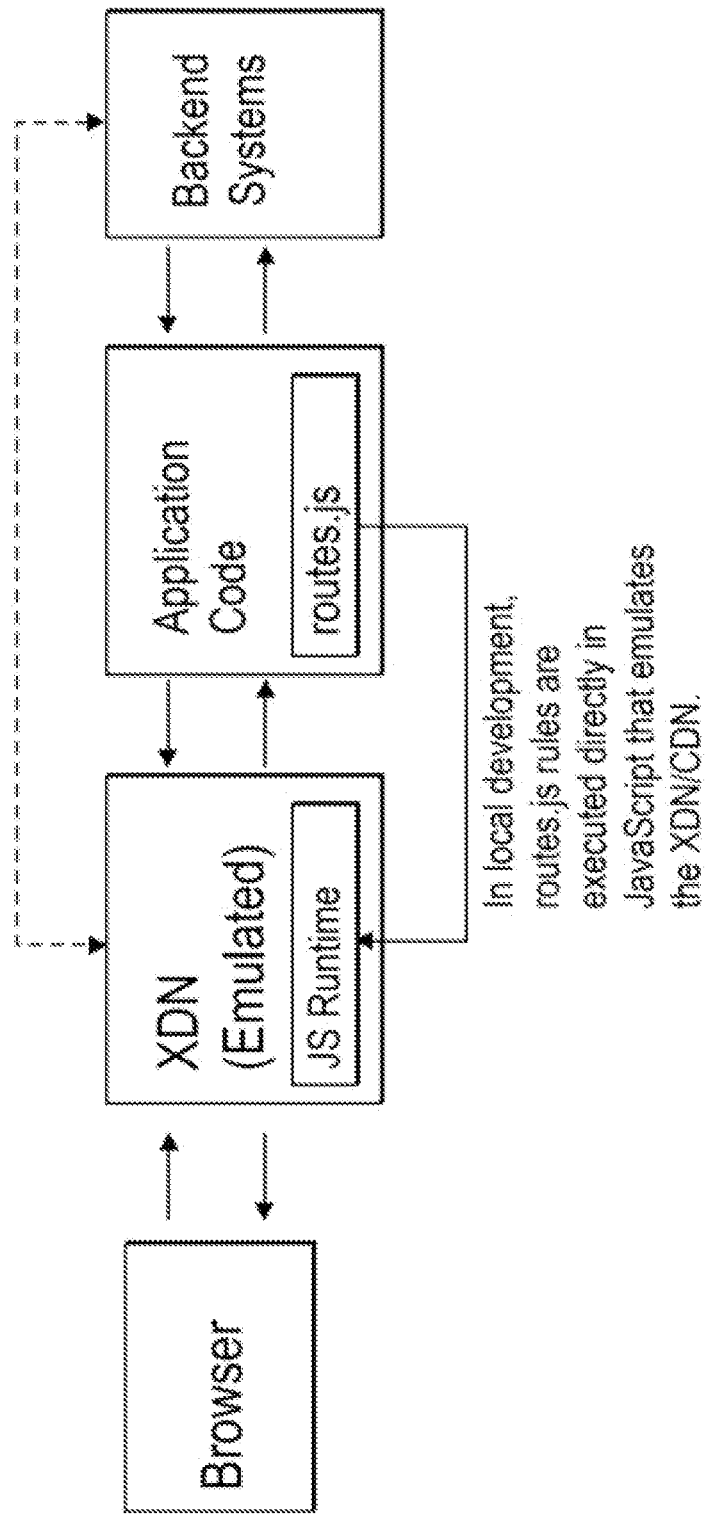
FIG. 4 illustrates a diagram of the JavaScript runtime, which can be used during development to emulate the CDN in accordance with some embodiments.

FIG. 4 illustrates a diagram of the JavaScript runtime, which can be used during development to emulate the CDN and the CDN-as-JavaScript when no real CDN exists (e.g., during local development or in the cloud when a real CDN or selected CDN is not yet available. In the JavaScript runtime case, the CDN-as-JavaScript API can be implemented in raw JavaScript/Typescript. This implementation can emulate the behavior of the CDN-as-JavaScript including caching and storing requests. However, in the case of CDN infrastructures that support the application code programming language (e.g., JavaScript), parts of the JavaScript runtime may be used in production.

Figure 5:
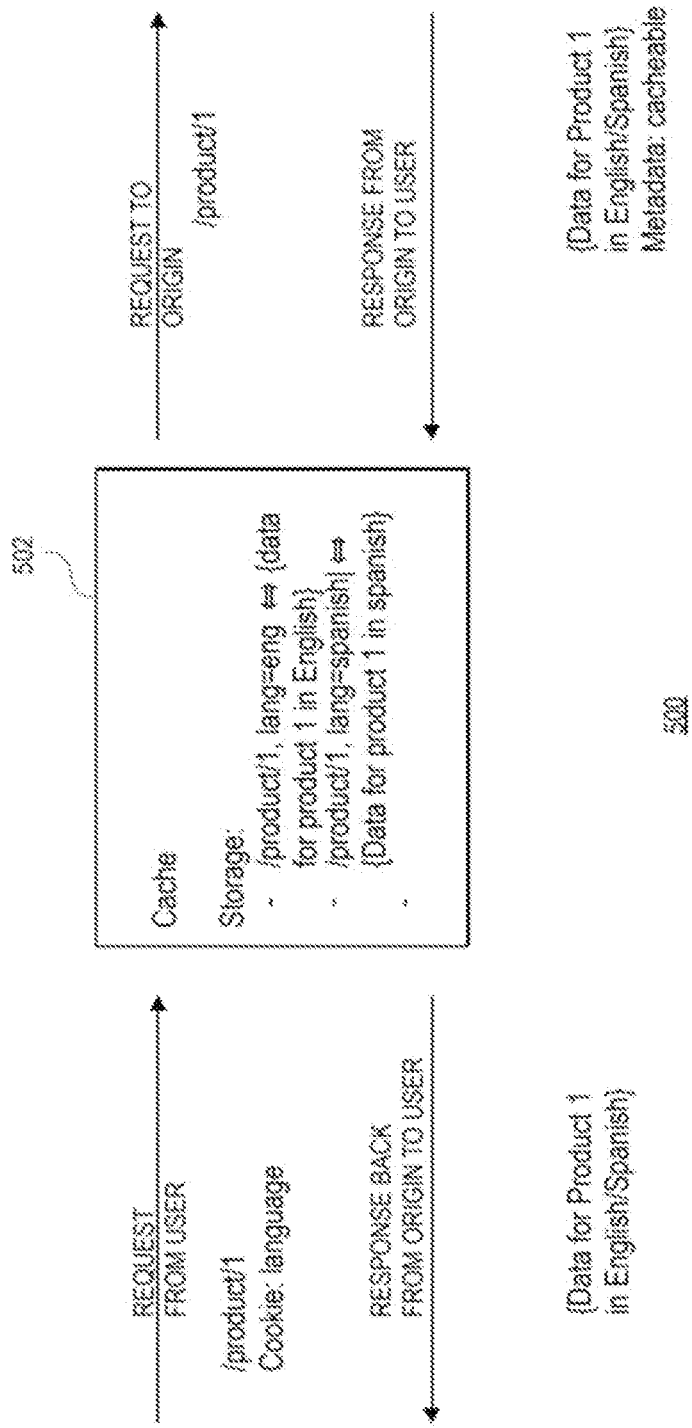
FIG. 5 illustrates a diagram of caching behavior in a CDN, in accordance with some embodiments.

FIG. 5 illustrates a diagram 500 of caching behavior in a CDN. A request from a user for content, data or functionality is received at the edge 502 of a computing network. The edge 502 can be a node of a CDN close to the user making the request and can include an edge server, a collection of servers, nodes or other computing resources at the edge of a computing network that receives and responds to requests from users. User requests can be HTTP requests, API requests or any other request for content, data, functionality over the internet. The edge 502 maintains one or more cache storages (e.g., Storage A and B), the contents of which are determined based on the cache policy upon which the edge 502 operates. Therefore, the edge 502 and its computing resources can maintain one or more environments corresponding to one or more cache policies.

Additionally, many possibilities can be contemplated for the variety of operations which the system may perform with respect to the request and/or response. For example, the system may perform one or more operations with respect to headers and/or cookies, including, e.g., setting, updating, or removing a response header; adding, updating, or removing an upstream response cookie; or adding, updating, or removing a response cookie generally; setting, updating, or removing a request header; adding, updating, or removing an upstream request cookie; or adding, updating, or removing a request cookie generally. The system may also, e.g., forward a request to a same path as a backend or a different path, cache proxied requests at the edge, proxy to different backends based on different host names, serve static files, fall back to server side rendering, serve a custom "404" page, redirect or block traffic, and whitelist specific IP addresses.

In some cases, the request from the user can include a URL, for example a request for a product page from an e-commerce website (e.g., site.com/product/1). In this scenario, a cache key identical to the URL or based on the URL can be used to define a cache policy and the contents in the cache storages. The cache storages maintained at the edge 502 can be indexed and searchable based on a plurality of cache keys. When the edge 502 receives a user request, it searches its cache storage based on the plurality of cache keys to determine if the request can be serviced with what exists in the cache. If the request cannot be serviced with the cache, the edge 502 forwards the request to a point upstream, where the request can be serviced. The point upstream can be another node in the edge, a serverless network, a cloud network, or the origin server (e.g., the e-commerce server). The point upstream sends a response back to the edge 502, which is responsive to the user request. In some cases, the point upstream can send the response along with metadata containing caching instructions to the edge 502. For example, the metadata can indicate the user response includes cacheable content, data, and functionality, which the edge 502 should cache henceforth. The edge 502 can forward the response to the user and execute the embedded caching instructions.

For subsequent user requests, the edge 502 can find the cached content, data, or functionality (as a result of a previous request) and serve that to a relevant request. As described earlier, the searching of the cache is based on the cache key.

In some cases, the URL as cache key may not be enough to give an application developer flexibility in defining caching behavior and to fully take advantage of optimization possible at the CDN when more granular caching policies are available. For example, the user may be in a geographical location, where a different language is spoken. In the context of e-commerce product pages, it may be advantageous to cache the same content/product pages in various languages. Besides language, other parameters may be of interest and/or related to caching policy at the edge. These can include user currency, user region, or other user-based cache policy customization. For example, users can be categorized based on various criteria and directed to different caching environments. An e-commerce operator may select to send different product pages in response to a user request, based on a user category derived from prior expenditure patterns. For example, VIP users may be served product pages with more premium items, compared to less frequent shoppers. In these cases, the desired data for basing caching policy is not entirely contained in a URL, therefore, custom cache keys based on additional metadata can be used. In some cases, the additional data to base a cache policy can be found in user cookies. In other words, a cache policy can be defined, not only based on URLs, but also based on additional metadata in HTTP headers and cookies of the request or response.

In some cases, one or more values in a user cookie can directly become cache keys upon which one or more cache policies can act. For example, a cookie called "user_language_preference" can directly yield several cache keys based on various available languages. In other cases, the cookies can further be partitioned, where cache keys are derived and defined based on an analysis of the values of one or more cookies. This can be termed custom cache key generation based on cookie partitioning. For example, in the case of categorizing users based on previous shopping patterns, a cookie can be partitioned into various cache keys and sub-cache keys based on one or more frequency parameters embedded in the one or more cookies. Subsequently, the different cache keys derived from partitioned cookies can be used by a single cache policy or be routed to different cache policies.

Another flexibility afforded to the users of the CDN and the CDN operators by availability of custom cache keys is cache key normalization, which refers to adding or subtracting parameters from a user request to streamline the caching behavior and more precisely define caching policies based on parameters that matter. For example, a user request in the form of a URL can include a variety of query parameters, which bear no relation or minimum relation to the goals of caching and application response optimization. When a user request, such as a URL is directly used as cache key, without further customization, the likelihood of future cache hits based on that cache key is reduced because few future requests would contain the extraneous data that for a variety of reasons were present in the original user request (e.g., URL). For example, in the case of a user request containing URLs, it is not uncommon to encounter a long string of text, with only few characters relevant to caching behavior. The bulk of the URL in these cases can be marketing tracking data, such as where or how the request was generated, the particular platform from which it came from (e.g., social media, marketing campaign, etc.). This can mean every time a user clicks on a link, a different URL is generated and sent to the CDN. Such marketing material is used in the marketing analytics module on the application server but typically has no impact on the content returned, and as a result should be ignored in the caching policy to improve the speed and responsiveness of the application. Typical CDNs have no way of determining that the received URLs are requesting the same content, data, or functionality because they do not have any information on the relationship between the parts of the URL they receive and the impact to the cacheability of content.

The ability to define custom cache keys (not entirely based on URL) allows the cache key to be generated with the relevant caching parameters and ignoring extraneous material. The described embodiments enable a CDN-as programming language line of code that can define selected caching parameters via affirmative declaration or via blacklist or filter-out lists. For example, in CDN-as a programming language the following lines of code can define a cache key that ignores all query parameters in a URL, except the skuID, which in the case of an e-commerce application, uniquely identifies a product page:

Edge: {
Key: new CustomCacheKey ( )
.excludeAllQueryParametersExcept('skuID')

In another example, the exclusion line of code can include language or any other customization parameters based on which a cache key could be defined. For example, .excludeAllQueryParametersExcept (['skuID','lang']) would exclude all query parameters except skuID and language. In other words, the described embodiments, can define custom cache keys based on selected parameters that may be found in cookies, HTTP headers, URLs or other main or metadata found in a user's request. Furthermore, this cache key definition is available to the application developer and can be embedded in the same code in which the application program code is written.

In some embodiments, the CDN-as programming language platform can provide a graphical user interface (GUI) to the operator of the application, by which the operator of the application who may not be a technically savvy individual can manipulate the parameters relevant to directing traffic. When such changes also affect the caching, caching policies and/or CDN behavior previously coded by the application developer, the content delivery network (XDN) can implement the corresponding changes, so the CDN behavior is automatically updated.

Exemplary Method

Figure 6:
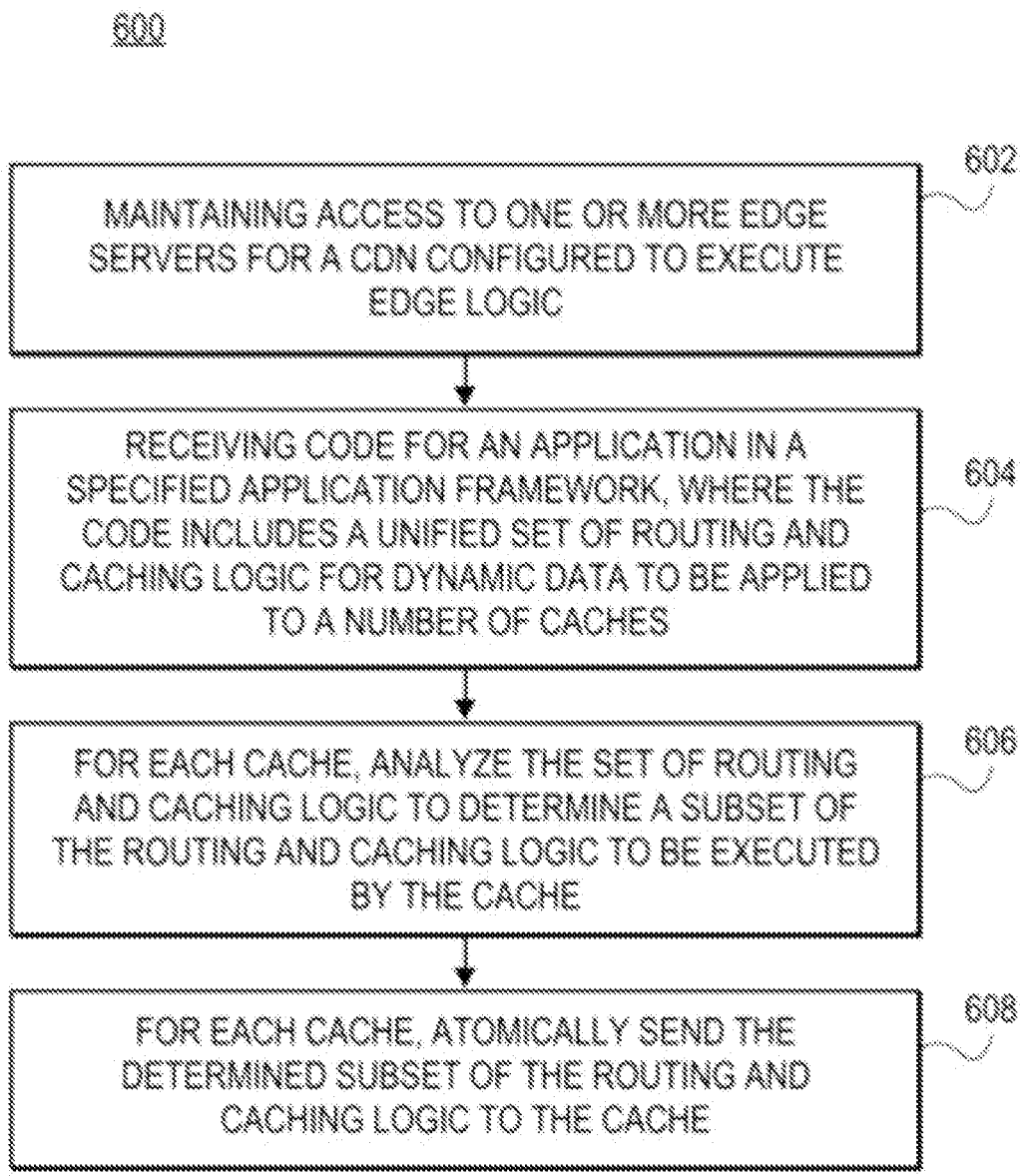
FIG. 6 illustrates a flowchart of a method for providing unified routing and caching logic for an application utilizing a CDN, in accordance with some embodiments.

FIG. 6 is a flow chart illustrating an exemplary method that may be performed in some embodiments.

At step 602, the system maintains access to one or more edge servers for a CDN configured to execute edge logic. Edge logic can refer to rules and logic for controlling routing and caching behavior in more sophisticated or complex ways than the standard HTTP caching specification provides. As an example, a conventional CDN would simply observe the standard caching header and operate accordingly, while a CDN incorporating edge logic would specify complex caching and routing behavior within the application code.

As used throughout, "logic" can refer to, e.g., rules, instructions, policies, and/or contractual relationships between components which control, stipulate, define, and/or constrain behavior in some way. The term "logic" is not used to describe or suggest Turing completeness within any system or component herein, nor does it describe discrete math or discrete logic in a classical or traditional sense. Rather, it describes rules or instructions for components which can be language-like or can be specified by a language, data format, or other sophisticated representation of data and behavior (such as, e.g., JSON). Such rules and instructions can have, for example, variables which are instantiated and deployed, as well as operations which can take into account various contexts or situations and react accordingly.

At step 604, the system receives code for an application in a specified application framework recognized by the system, where the code and/or application framework include a unified set of routing and caching logic for dynamic data to be applied to a number of caches. The unified set if routing and caching logic is derived from a centralized definition, which is formed from the combination of the application code and the specified application framework. In some embodiments, routing and caching logic can be defined and handled programmatically, via a programming language or Application Programming Interface ("API") (e.g., JavaScript API, or any other suitable programming language or API). For example, a package may provide a JavaScript API for controlling routing and caching from application code rather than through a CDN web portal. Using this CDN-as-programming-language approach allows this vital routing logic to be tested, reviewed, and version controlled like the rest of the application code. In some embodiments, the application framework is specified through the content of the application code. For example, a developer writing the application code may use the statement "use(NextRoutes)", which specifies that the Next.js application framework is to be used.

In some embodiments, at least some of the edge logic and behavior is implicitly specified by the framework the developer has chosen, and the system functions to extract those behaviors. An application framework is a software framework which automates at least some of the overhead associated with common activities performed in web development. The application framework deploys or executes the application in such a way that the flow of control is not dictated by the caller of the application, but by the framework itself. In some embodiments, the framework in combination with the application code defines the routes within an application, and exerts some influence on edge behavior. In other words, the combination of the chosen framework and the developer supplied application code defines the routes within an application. In some embodiments, the application framework defines behaviors and the system determines the routes within the application based on these behaviors. In some embodiments, the system will allow a developer to specify one or more behaviors to occur in the application code, where the behaviors are implicitly defined within the application framework. The system then automates as much of these behaviors as possible based on the definitions within the specified application framework.

Examples of caching and routing logic may include, for example: sending proxy requests to upstream sites; sending redirects from the network edge; rendering responses on the server using an application framework; altering requests and response headers; sending synthetic responses; or any other suitable routing logic. In some embodiments, routes may be declared using a method corresponding to an HTTP method the developer wishes to match. HTTP methods may include, e.g., get, put, post, patch, delete, or head. In some embodiments, routing logic may be capable of handling execution of multiple routes for a given request. For example, a common pattern involves caching the response with one route and rendering the response with a later route. Another common pattern may involve utilizing the value or presence of certain headers or cookies in the routing and caching decisions.

The unified set of routing and caching logic relates to dynamic data within the application, as specified in, for example, the combination of the application code and the application framework. The routing and caching logic is applied to a number of caches, i.e., more than one cache has routing and caching logic applied to it. The caches relate to the multiple caches present within the infrastructure used to deliver and consume a web application. The caches may include, e.g., a browser cache, a service worker cache, and/or one or more CDN caches. The CDN caches may include two or more layers, including, e.g., edge points of presence (POPs), and centralized "shield" POPs which the edge POPs receive confirmation from prior to fetching data from the origin server. As traffic is routed within an application, data is populated within these POPs.

Figure 7:
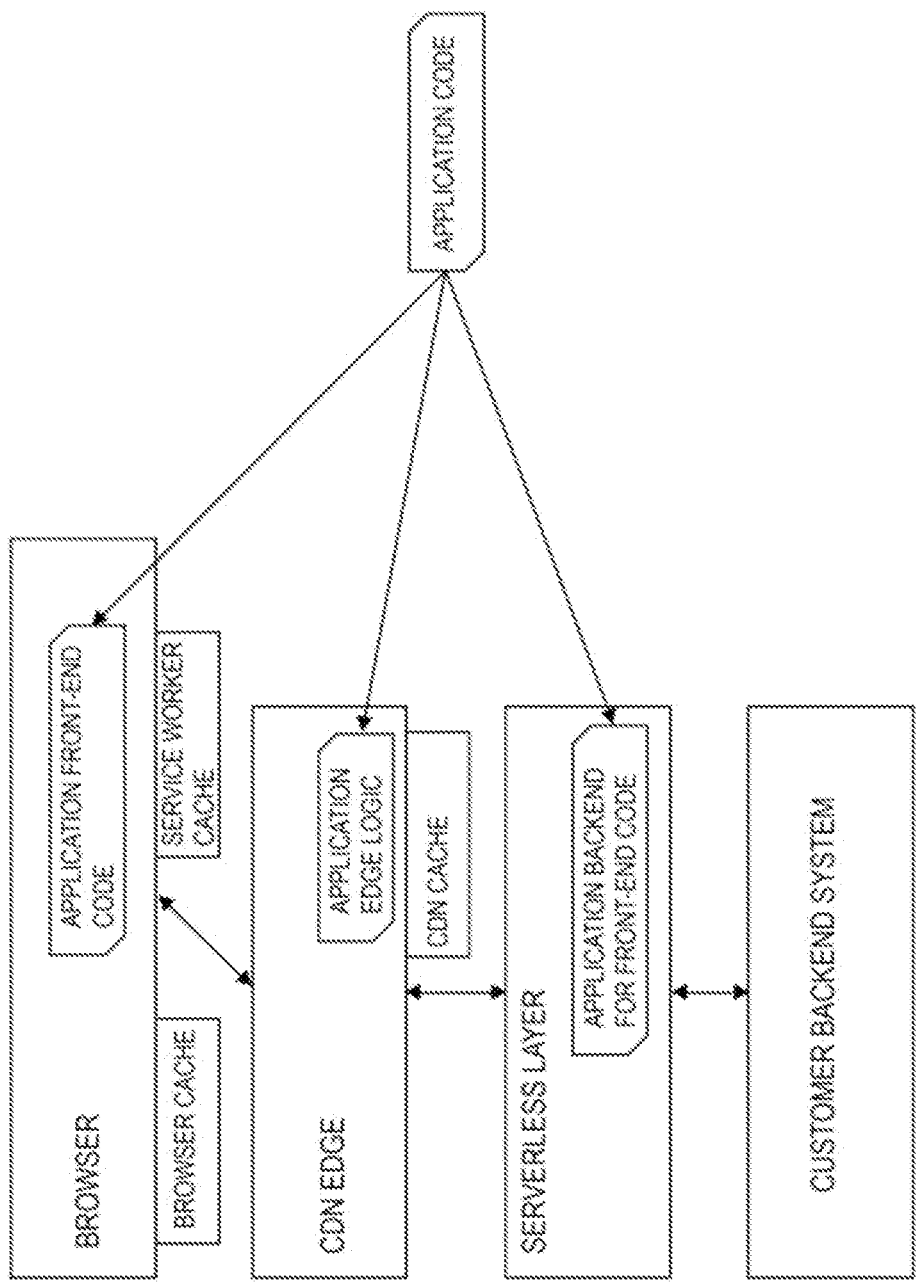
FIG. 7 illustrates an implementation example of a system for providing unified routing and caching logic, in accordance with some embodiments.

An example of an architecture involving multiple caches within a CDN is illustrated in FIG. 7 in accordance with some embodiments.

Within the example architecture, a browser, CDN edge, serverless layer (i.e., a server or cluster of servers which act as an application layer without needing to be managed), and customer backend system are present. A browser cache and service worker cache are contained in the browser or are otherwise connected to the browser. A CDN cache is contained in the CDN edge. Application code for the application is split up into multiple bundles of code, including: application front-end code which may control the browser cache, and which runs within the browser; application edge logic controlling the CDN cache which runs within the CDN edge; and application backend for the front-end code which runs within the serverless layer. In some embodiments, an additional bundle may include service worker code controlling the service worker cache, which runs within the browser.

In some embodiments, the application code is written in a specific application framework, which is specified within the application code, and provides the front end for the application. CDN-as-programming language allows the developer to specify caching and routing behaviors for each layer in the infrastructure stack or behaviors that coordinate between the layers (e.g. prefetching). In addition, the application framework may specify or imply browser caching rules as well as service worker caching rules. The CDN-as-programming language code, in combination with the specified application framework, derives caching and routing policies for the browser, service worker, and edge rules which are populated to the front-end code, service worker code, and edge layers respectively when the application is deployed to the application execution layer.

The system illustrated in FIG. 7 is deployed as one atomic unit. That is, a single application code in combination with an application framework can define the frontend, backend, a set of rules directed to different caches within the system, and more. The application code serves conceptually as an atomic container or atomic bundle of code for a single, unified deployment. The system sends these caching rules atomically to the different caches so that, e.g., the front-end code, service worker code, application edge logic, and/or application backend for front-end code are all bound together logically. Sending the caching rules can potentially take different forms within different use cases and embodiments. For example, in the case of a service worker, the service worker code and instructions get served to the browser when an application's JavaScript is loaded. In the case of edge servers, edge logic is sent to the edge servers. In the case of the application code, the application version is part of the edge cache key so that the cache key is effectively only used with the appropriate version of the app.

Returning to FIG. 6, at step 606, for each of the caches within the system, the system analyzes the set of routing and caching logic which are defined by the code and/or application framework in order to determine a subset of the routing and caching logic to be executed by the cache. In some embodiments, the subset is determined by the centralized definition of the routing and caching logic which is formed from the combination of the application code and the application framework.

In some embodiments, the application framework will define routes corresponding to files in pages or within a directory. For example, if there is a file named "foo.js" in an appropriate directory, then the edge server will support a route called "/foo".

In some embodiments, the system may be configured to analyze caching and routing behavior defined within the application framework, and analyze the application code in the context of those defined behaviors. The system can then use that analysis to automatically configure the edge based on the caching and routing behaviors defined in the application framework. In some embodiments, the system may configure as such to automatically take routes, analyze and understand the context of the routes, and automatically propagate them to the edge server within a single line. For example, as shown in the example application code "routes.js" in FIG. 8, ".use(NextRoutes)" may be used within a single line to propagate a route to the edge server based on the caching and routing behaviors defined in the Next application framework. The "use" statement analyzes the routing and caching logic statements within the application framework and/or application code, and implicitly understands the routing and caching that are the consequence of the application code and the framework. Additionally, this allows the developer to specify routing and caching using the routes of their application framework. The system then populates the edge logic to match the behavior of the application server when running the application code with the chosen application framework. Thus, if some aspect of the application calls those statements, the system will automatically analyze and propagate them.

In some embodiments, the developer can explicitly add one or more commands for edge logic beyond what is specified by the application code or the application framework. For example, a developer may specify fallback or migration commands for the edge.

In some embodiments, at least some of the set of routing behaviors relate to routing unmatched application routes directly to an alternate application server. For example, the system can be configured to add additional routes before and after the middleware, such as for the purpose of sending URLs to an alternate backend. This may be useful for, e.g., gradually replacing an existing site with a new application. In some embodiments, the system can use this capability to "fall back" to a legacy site for any route that the application is not configured to handle. In some embodiments, using environment variables can provide for configuration of different legacy domains for each application environment.

Returning to FIG. 6, at step 608, for each of the caches within the system, the system atomically sends the determined subset of the routing and caching logic to the cache. The subset of routing and caching logic is processed and/or executed at the server where the cache is located, and any remaining routing or caching logic is executed at one or more application servers.

In some embodiments, atomically sending the determined subset of the routing and caching logic to the cache involves embedding an identifier in the edge logic submodule that the edge logic submodule passes along as metadata in its requests to the application execution layer. The application execution layer will then recognize the identifier and route the request to only that variant of the application code. In this manner, the edge logic submodule is bound to the application code it was generated from and will not serve requests/responses for other variants of the application code.

In some embodiments, the system sends the subset of the routing and caching logic to the edge servers, and sends the application code to the one or more application servers, such that the edge logic handling a request or response matches the corresponding application code. In some embodiments, the length of time to cache a given piece or set of data is defined within the routing and caching logic. When the edge logic handles the request or response, it proceeds based on this length of time, if defined. For example, a cache( ) statement in the application code will configure caching parameters, including how long a response will be in the cache for before it is removed. In addition the system can instruct a service worker to cache based on these parameters in addition to the edge and these parameters may be identical or different from those used by the edge but may still reflect coordination with the edge logic. For example, in some embodiments, the front-end code utilizes the service worker for predictive prefetching of data before the user requests it. Because prefetching increases the number of requests from the device it could place excessive strain on the origin server with this increase in traffic. As a result the service worker and the edge logic may require, e.g., a "contract", or shared set of policies which are adhered to, regarding prefetching.

For example, in some embodiments the contract between the service worker and edge logic is such that the service worker will distinguish prefetched requests from regular requests by way of additional metadata in the request, and the edge logic will either serve these prefetched requests with responses from the cache or return an error if the response is not in the cache and never fetch the response from the origin. In this manner, excessive pressure on the origin is avoided. In other words, in some embodiments, prefetching behavior may be automatically configured to instruct the service worker to prefetch data and mark it with metadata to distinguish it from user traffic, and instruct the corresponding edge logic to not forward the prefetch request to the origin if the response for that request is not in the cache. This prefetching behavior thus can include a set of policies which stipulate that when the response for the prefetch request is not yet in the cache, then the edge server will reject it, and it will not be forwarded to the origin. This saves the origin from being forced to handle a potentially massive influx of load on deploy or cache clearing, especially during high-traffic periods. In various embodiments, prefetching behavior can be automatically or semi-automatically configured in a variety of other ways to reduce load on the origin or otherwise improve the efficiency and operation of the system. In some embodiments, one or more developments may be able to override prefetch behavior in various ways to achieve similar results and/or to carve out exceptions, e.g., where requests for uncached data will still be forwarded to the origin.

As another example, the service worker may need to transform the request from problematic format for caching (e.g. GraphQL requests which are typically uncacheable POST requests) and the edge logic will need to reverse the transformation done by the service worker when forwarding the request to the application execution layer or customer backend system. Maintaining contracts between the caches in multiple systems such as the edge logic and service worker is easier to maintain when it comes from a centralized definition. A regular cache may specify a maximum caching age of only seconds, and if a request comes in after this time, then the response should not be in the cache, and it should be fetched from the origin instead. In some embodiments, a StaleWhileRevalidate or similar statement may specify that if the caching age has expired, the response should still be served from the cache, but the cache should simultaneously fetch a new version directly from the server in order to refresh the cache with the response. These cache parameters can be specified based on requests matching a variety of criteria including but not limited to path, route, host, and HTTP header values.

In some embodiments, the routing and caching logic can be configured to emulate edge logic within the application server when a CDN is not present, when the application is executed on a local server, or both. Thus, a CDN-based application can potentially be run locally, without need for the CDN. This is useful for testing, local development, and similar purposes. In some embodiments, a history of deployments can be presented to the user, such that the application code is versioned with a full history. This is possible because the application code can be analyzed by the system and routes can be defined within context. Each of the routes can then be defined and cached within a given version of the application code, allowing the program to be run locally. Each different version can be said to be an atomic bundle of past deployments, in that it bundles the edge logic, routing and caching behavior, and other aspects of the application.

In some embodiments, a developer dashboard can be presented within a user interface. The developer dashboard is populated with the routes of the application, the subset of routing behaviors, and the traffic and cache metrics for each of the routes of the application. In some embodiments, the CDN-as programming language platform can provide such as a developer dashboard as a graphical user interface (GUI) to the operator of the application, by which the operator of the application, who may not be a technically savvy individual, can manipulate the parameters relevant to directing traffic. When such changes also affect the caching, caching policies and/or CDN behavior previously coded by the application developer, the content delivery network (XDN) can implement the corresponding changes, so the CDN behavior is automatically updated. For example, in some embodiments, the master switch (as a separate component or as an embedded component in one of the cache variants) can accept GUI inputs related to directing traffic at the edge and relevant selected criteria and can direct the application traffic accordingly at the edge. In other words, the developer of the application, through the described embodiments, is empowered to code the CDN behavior, such as caching, as embedded code in the application program code, while a non-technical operator of the application can direct traffic at the edge based on preselected criteria, using a GUI. Advantageously, the actions taken by the operator in the GUI will be coordinated so as to not interfere with the caching defined by the developer. For example, the operator of the application can choose percentages and criteria by which incoming traffic is routed to cache variants.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 9:
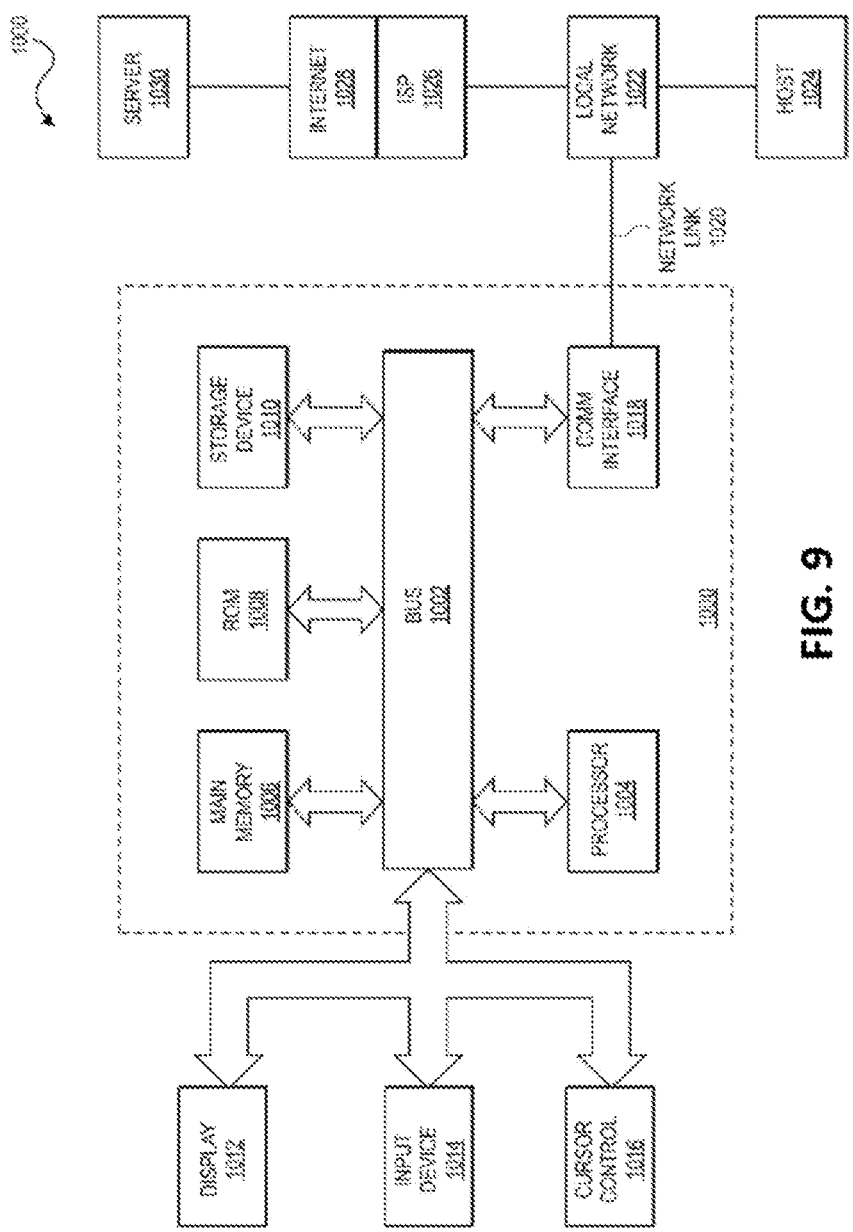
FIG. 9 illustrates an environment in which some embodiments may operate.

For example, FIG. 9 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touchscreen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method of configuring one or more caches of a web application to be used with a content delivery network (CDN), the web application being in an application framework and comprising a plurality of caches, the method comprising:
    analyzing code for the web application in the application framework to identify, from a set of routing and caching logic for the web application,
        (1) the one or more caches, of the plurality of caches of the web application, to which at least some of the set of routing and caching logic apply, and
        (2) for each cache of the one or more caches, a subset of the routing and caching logic applicable to the respective cache; and
    for each cache of the one or more caches, triggering configuration of the respective cache with the subset of the routing and caching logic identified in the analyzing as applicable to the respective cache, wherein the triggering configuration for each cache of the plurality of caches comprises sending the subset of the routing and caching logic to the respective cache.

2. The method of claim 1, wherein the plurality of caches comprises at least one of: a browser cache, a service worker cache, or one or more CDN caches.

3. The method of claim 1, wherein the routing and caching logic comprises one or more of: cache expiration times, stale-while-revalidate time, cache key computation logic, associated application version, private and public cache behaviors, browser and edge cache behaviors, or prefetch behaviors.

4. The method of claim 1, further comprising:
    in response to a request in the web application, directing the request to a version of edge logic corresponding to a version of the code of the web application.

5. The method of claim 4, further comprising:
    receiving a cache policy associated with at least one of the plurality of caches; and
    atomically binding the cache policy and the code for the web application such that the cache policy executes only in conjunction with the version of the code of the web application.

6. The method of claim 1, further comprising:
    selecting the web application from a plurality of application versions of the web application, wherein each application version comprises a different version of the code of the web application and of the routing and caching logic for each of the plurality of caches based on a past deployment of the web application.

7. The method of claim 1, wherein the web application is executed such that dynamic web pages and/or API data are pre-fetched and served from one or more edge servers according to the set of routing and caching logic.

8. The method of claim 1, further comprising:
    providing the code of the web application and the routing and caching logic for each of the plurality of caches to local storage of a client device,
    wherein the code of the web application and the routing and caching logic for each of the plurality of caches is processed and/or executed locally at the client device when the CDN is not accessible by the client device.

9. The method of claim 1, wherein the set of routing and caching logic for the web application is a unified set of routing and caching logic for the plurality of caches of the web application.

10. The method of claim 1, wherein, for each cache of the one or more caches, sending the subset of the routing and caching logic to the cache comprises, for each cache of the one or more caches, atomically sending the subset of the routing and caching logic to the respective cache.

11. At least one non-transitory computer-readable medium containing instructions that, when executed by at least one processor, cause the at least one processor to carry out a method of configuring one or more caches of a web application to be used with a content delivery network (CDN), the web application being in an application framework and comprising a plurality of caches, the method comprising:
    analyzing code for the web application in the application framework to identify, from a set of routing and caching logic for the web application,
        (1) the one or more caches, of the plurality of caches of the web application, to which at least some of the set of routing and caching logic apply, and
        (2) for each cache of the one or more caches, a subset of the routing and caching logic applicable to the respective cache; and
    for each cache of the one or more caches, triggering configuration of the respective cache with the subset of the routing and caching logic identified in the analyzing as applicable to the respective cache, wherein the triggering configuration for each cache of the plurality of caches comprises sending the subset of the routing and caching logic to the respective cache.

12. The at least one non-transitory computer-readable medium of claim 11, wherein the plurality of caches comprises at least one of: a browser cache, a service worker cache, or one or more CDN caches.

13. The at least one non-transitory computer-readable medium of claim 11, wherein the routing and caching logic comprises one or more of: cache expiration times, stale-while-revalidate time, cache key computation logic, associated application version, private and public cache behaviors, browser and edge cache behaviors, or prefetch behaviors.

14. The at least one non-transitory computer-readable medium of claim 11, wherein the method further comprises: in response to a request in the web application, directing the request to a version of edge logic corresponding to a version of the code of the web application.

15. The at least one non-transitory computer-readable medium of claim 14, wherein the method further comprises:
    receiving a cache policy associated with at least one of the plurality of caches; and
    atomically binding the cache policy and the code for the web application such that the cache policy executes only in conjunction with the version of the code of the web application.

16. The at least one non-transitory computer-readable medium of claim 11, wherein the method further comprises:
    selecting the web application from a plurality of application versions of the web application, wherein each application version comprises a different version of the code of the web application and of the routing and caching logic for each of the plurality of caches based on a past deployment of the web application.

17. The at least one non-transitory computer-readable medium of claim 11, wherein the web application is executed such that dynamic web pages and/or API data are pre-fetched and served from one or more edge servers according to the set of routing and caching logic.

18. The at least one non-transitory computer-readable medium of claim 11, wherein the method further comprises:
    providing the code of the web application and the routing and caching logic for each of the plurality of caches to local storage of a client device,
    wherein the code of the web application and the routing and caching logic for each of the plurality of caches is processed and/or executed locally at the client device when the CDN is not accessible by the client device.

19. A communication system comprising:
    one or more processors; and
    at least one storage medium having encoded thereon executable instructions that, when executed by the one or more processors, cause the one or more processors to carry out a method of configuring one or more caches of a web application to be used with a content delivery network (CDN), the web application being in an application framework and comprising a plurality of caches, the method comprising:
        analyzing code for the web application in the application framework to identify, from a set of routing and caching logic for the web application,
            (1) the one or more caches, of the plurality of caches of the web application, to which at least some of the set of routing and caching logic apply, and
            (2) for each cache of the one or more caches, a subset of the routing and caching logic applicable to the respective cache; and
        for each cache of the one or more caches, triggering configuration of the respective cache with the subset of the routing and caching logic identified in the analyzing as applicable to the respective cache, wherein the triggering configuration for each cache of the plurality of caches comprises sending the subset of the routing and caching logic to the respective cache.

20. The communication system of claim 19, wherein the method further comprises:
    in response to a request in the application, directing the request to a version of edge logic corresponding to a version of the code of the application.

* * * * *